United States Patent
de Lazzer et al.

[11] Patent Number: 5,758,718
[45] Date of Patent: Jun. 2, 1998

[54] PLATE HEAT EXCHANGER

[75] Inventors: Karl-Heinz de Lazzer, Friedrichshafen; Franz Haug, Brochenzell, both of Germany

[73] Assignee: MTU Motoren- Und Turbinen-Union Friedrichshafen GmbH, Germany

[21] Appl. No.: 525,083

[22] Filed: Sep. 8, 1995

[30] Foreign Application Priority Data

Sep. 16, 1994 [DE] Germany ............... 44 33 165.7

[51] Int. Cl.$^6$ ............................................. F28F 7/00
[52] U.S. Cl. .................... 165/81; 165/149; 165/153; 165/166
[58] Field of Search ................. 165/81, 149, 153, 165/144, 166

[56] References Cited

U.S. PATENT DOCUMENTS

| | | | |
|---|---|---|---|
| 1,894,279 | 1/1933 | Meyer | 165/81 X |
| 1,962,909 | 6/1934 | Price | 165/81 X |
| 1,976,102 | 10/1934 | Young et al. | 165/81 X |
| 2,376,749 | 5/1945 | Belaieff | 165/153 X |
| 2,782,009 | 2/1957 | Rippingille | 165/153 X |
| 4,297,775 | 11/1981 | Butt et al. | 165/166 X |
| 4,559,994 | 12/1985 | Waldmann et al. | 165/144 X |
| 4,673,032 | 6/1987 | Hara et al. | 165/144 X |

FOREIGN PATENT DOCUMENTS

| | | | |
|---|---|---|---|
| 176382 | 4/1986 | European Pat. Off. | 165/144 |
| 2 545 842 | 6/1993 | European Pat. Off. | |
| 43 07 503 | 9/1994 | Germany . | |
| 268199 | 9/1992 | Japan | 165/149 |
| 2 086 030 | 5/1992 | United Kingdom . | |

*Primary Examiner*—Leonard R. Leo
*Attorney, Agent, or Firm*—Evenson, McKeown, Edwards & Lenahan, P.L.L.C.

[57] ABSTRACT

A heat exchanger of a plate construction, as used, for example, in a water-cooled charge air cooler with air-side lamella plates avoids undesirable thermal expansion effects which occur in the transient operation of a charge air cooler and result in damage. The otherwise completely hard-soldered cooler block is divided along a plane parallel to the plate planes into two or more partial blocks. When the partial blocks are combined at a mutual distance to form a cooler block assembly, each partial block receives a clearance in the transverse direction which compensates the thermally caused transverse expansions of the individual blocks.

5 Claims, 2 Drawing Sheets

16
PLATE HEAT EXCHANGER

BACKGROUND AND SUMMARY OF THE INVENTION

The present invention relates to heat exchanger of a plate construction, particularly to plate heat exchangers constructed as water-cooled charge air coolers with air-side lamella plates, on which is provided a cooler block having metal sheets and rods arranged substantially parallel at regular distances to form water ducts, lamella plates to form air ducts, lateral parts and water collecting boxes fastened in a liquid-tight manner on cooler block ends feeding and discharging a coolant.

Generally speaking, plate heat exchangers consist of a number of walls which guide the air or liquid flow and the coolant flows to be cooled so that mixing of these two media cannot occur. The heat exchange therefore takes place directly by way of the walls and the lamellae which generally consist of a metal with good heat-conducting characteristics. For minimizing the constructional expenditures, the media flows are guided according to the cross-current or cross-countercurrent principle.

With respect to their basic construction, water-cooled plate heat exchangers may be divided into circular tube cooling systems and flat tube cooling systems. Of these two cooling systems, while it has the same constructional dimensions, the flat-tube cooling system has a more favorable ratio of the cooling performance to the charge-air side pressure loss. This is because, as a result of their fluidically favorable shape, flat tubes cause lower pressure loss values on the charge air side and may therefore be more intensively ribbed. With this constructional principle of a plate heat exchanger of the above-mentioned type, water ducts and air conducting ducts are therefore combined in a regular arrangement as a layering of several plates to form a cooler block and are completely hard-soldered to one another. The cooler block, which is therefore fixed in its shape, is inserted and welded in a completely preassembled manner in a receiving frame which, at the same time, forms the water collecting boxes, through which the coolant flows, and the conducting devices for the air to be cooled.

This basic construction of a known cooler block which is surrounded by coolant and through which the hot medium flows which is to be cooled and which therefore heats up correspondingly always results in high thermal stress within the entire structure. Because of this construction, which has a cooling jacket on the outside and a hot cooler block matrix on the inside, there is necessarily a temperature gradient from the cooler block interior toward the outside to the cooling jacket during the operation of the heat exchanger. Because of the resulting different temperatures, the cooler block is prevented from expanding by the colder water collecting boxes which leads to deformations of the connecting points of the water ducts welded to the water collecting boxes.

For containing this temperature-caused expansion of the cooler block, newer constructions of plate heat exchangers, in special charge air coolers, also flow coolant through the lateral walls and cools them. Although, this measure may coordinate the longitudinal expansions of the individual plates and the expansion behavior of the lateral walls, temperature-caused expansion differences still exist between the cooler block and the water boxes in a direction which is perpendicular to the plate plane. The cause of this thermal expansion occurring in the transverse direction are the lamellae of the charge-air-conducting lamella plates which are each placed between two water ducts in a meandering manner and are hard-soldered to the water duct walls. In this case, the longitudinal expansions of the lamellae result in a temperature-dependent widening of the individual plate layers. As a result, thermal expansions of the individual lamella layers add up along the width of the cooler block.

As a alternative, a heat exchanger construction is described in DE 43 07 503 A1 in which, for controlling the temperature-caused expansion differences, the coolant-carrying water collecting boxes are constructed as feed and discharge tubes. For this purpose, these tubes are assembled as modules of individual tube pieces which are integrated into the plate construction and which are braced with respect to one another axially with respect to the tube by suitable ring-shaped spacing and sealing devices. Although, in this alternative construction, the coolant feed system and the coolant discharge system follow the temperature-fluctuation-caused longitudinal expansion movements of the plates, the mutual bracing of the individual plates axially with respect to the tube also represents a hindrance with respect to the expansion for the coolant supply in the direction perpendicularly to the plate plane. In particular, this, therefore, also results in disadvantageous deformations of the connecting points.

Because the cooler block, and particularly the connecting points of the water ducts, are firmly welded to the water boxes and therefore permit no relative shifting, any increase in the temperature of the cooler block will necessarily lead to a bending of the ducts in the transverse direction. The bending of the individual ducts, in turn, will result in angular changes at the connecting points. These angular changes will therefore rise with an increasing difference in the temperature of the air and the water (that is, of the media flowing through the heat exchanger) as well as with an increasing cooler width (that is, the number of plate layers). Particularly, in the case of the charge-air cooling of highly charged engines and a large load amplitude, these temperature-caused deformations generate high charge air temperature fluctuations which, in the case of operating load collectives with a high endurance, result in prematurely reaching the time change strength of the used materials. An undesirable consequence is damage of the connecting points with a crossing-over of the media.

Another source of damage to the charge air cooler in a plate construction are the temperature-caused deformations of the air lamellae on one or several rows of lamellae. The reason is that, while, as mentioned above, the individual plate layers bend in the transverse direction when temperatures are increased, the individual thermal expansions will add up along the transverse direction all the way to the lateral walls Because of the water boxes, which expand relatively little as a result of the temperature and which must therefore be considered to be rigid with respect to the cooler block, in the more exterior layers of the air lamellae, these thermal displacements will increasingly result in deformations of the lamellae themselves. Thus, the lamella layers are pressed against the coolant-cooled lateral walls, which are to be considered rigid, and are partially plastically deformed.

The lamella loops are, however, in each case fixedly soldered in their apexes with the adjoining water duct wall and are thus clearly fixed in their position. Consequently, the lamellae, which are squeezed at high temperatures when they are cooled, thus in the case of a low charge air temperature, first experience an elastic and then plastic back expansion. As described above, therefore, in the case of correspondingly frequently occurring load changes of the engine, the endurance of the lamella materials is exceeded and leads to breakages of the lamellae.

The U-shaped lamella pieces, which are formed by such relief cracks and which remain soldered on only at one point, are caused to vibrate by the charge air flowing through them and tear off. This creates the danger that the lamella pieces may arrive in the combustion space and/or rub through or start to tear the relatively thin walls of the water ducts and thus cause damage.

The present invention is based on the object of improving developing plate heat exchangers so that damage due to thermal expansion effects is avoided.

The foregoing object has been achieved in accordance with the present invention dividing the cooler block into at least two partial blocks along at least one plane which is parallel to the plate plane.

Thus, according to the present invention, the structure of the cooler block, which is otherwise hard-soldered together, is interrupted one or more times parallel to the plate plane. This interruption of the cooler block, which is inherently stable by itself, along a plate surface carries out a planned structural weakening of the corresponding air lamella plate layer. The lamella loops, which are otherwise soldered on both sides to the respective adjoining water duct walls, together form an inherently stable sandwich structure. This is the reason why occurring forces, as in the case described above, thermal expansion tensions are transmitted into the overall structure and are all absorbed thereby.

As a result of the fact that now a targeted weakening of this overall structure is provided, the summation effect of the individual forces is achieved in many partial sums corresponding to the intended number of subdivisions. Therefore, with respect to the overall construction of the cooling matrix, a quasi migrating of the thermal displacement to the outside into the outer lamella layers is therefore systematically interrupted. As a result, the displacement amplitude, which is large in the exterior layers, can be divided into smaller amounts of displacements absorbed by several lamella layers. In contrast to the hitherto occurring squeezing of the outer lamellae, which is large with respect to the amount, the thermal expansion according to the present invention can therefore be divided into sections which are smaller with respect to the amount.

The desired weak point of the cooling structure itself provided according to the invention, because of this weakening, will no longer be capable of transmitting the forces affecting it to the neighboring structure but, as previously the outer lamella layers will be plastically deformed. In contrast to previous deformations, however, the deformation of the desired weak point according to the present invention represents a calibrating operation in which the cooler block is automatically adapted to the thermal expansion conditions occurring in its structure and therefore will not be permanently damaged.

Although, in the desired weak point, the lamellae are also plastically deformed more in the apex of the bending and are plastically deformed less in the direction of the connecting points, this deformation takes place only once during the calibrating operation and even then only in one direction. Because of the interruption of the structure according to the invention, there is no longer any force-locking connection along the junction plane between the plate layers which adjoin there. Hence, in the specific case, the previously plastically buckled lamellae, when the cooler matrix has cooled off, will now no longer be subjected to a plastic recovery. After the calibrating operation has taken place, the lamellae of the junction plane must now withstand only a pulsating stress and are no longer, as previously subjected to an alternating repetition of stress. Here then, the pulsating stress can be compensated without any problem by way of the elastic ductility of the lamellae.

In principle, the division of the cooler matrix into two or several narrower partial blocks, which are adjacent but are not soldered to one another, may be provided without or with a slight in-between space. Independently of the respective provided distance, the bending and the angular change of the water ducts will therefore only still be ½ to ⅙ of the previous values. Therefore, independently of the embodiment of a cooler block according to the present invention, selected lamellae layers are mechanically stressed only to such a slight extent that a failure of the material because of thermal expansion can be significantly reduced.

In embodiments of the present invention in which the individual partial blocks are provided at a mutual distance, by the dimensioning of this distance directs the extent of the plastic deformation of the lamella layer which is set once during the calibrating operation. In addition, however, by selecting the corresponding distance, the one-time plastic deformation may also be excluded completely.

Particularly in usages with extreme temperature fluctuations, such a construction of the cooler block provides a reliable precaution against heat-expansion-caused damage to the charge air cooler and/or to the engine itself. In contrast, in applications with lower temperature fluctuation amplitudes, a large distance may noticeably impair the cooling performance of the heat exchanger because, at this point, a relatively large charge air mass flow can flow almost unhindered through the cooler matrix. A remedy for this limitation of the performance is a further currently preferred embodiment of the invention in which the cooler matrix is not placed along a contact plane between the water duct and the adjoining lamella plate. Instead of the lamella layer fixedly soldered on one side, two narrower lamella layers can be each soldered on one side to one of the mutually opposite water duct walls. The lamella layers, without any mutual force-locking connection, together penetrate the separating gap between two partial blocks. If thermal expansions occur, then the two lamella layers which face one another are pushed onto one another and partially into one another. Because of the bending elasticity of the lamellae fixedly soldered on one side, these lamellae are not necessarily plastically deformed but escape to the side with an elastic and/or one-time plastic deformation and can therefore be pushed into one another.

Other objects, advantages and novel features of the present invention will become apparent from the following detailed description of the invention when considered in conjunction with the accompanying drawings.

DETAILED DESCRIPTION OF THE DRAWINGS

FIGS. 1 through 4 illustrate three separate embodiments of the water-cooled charge air cooler according to the present invention. For reasons of simplicity, however, identical parts are provided with the same reference numbers in all four figures for the three embodiments.

All three embodiments show the air inlet into the cooler block 8, and coolant flows through them in the vertical direction, where the inflow is designated by the numeral 9 and the outflow is designated by the numeral 10.

Figure 1:
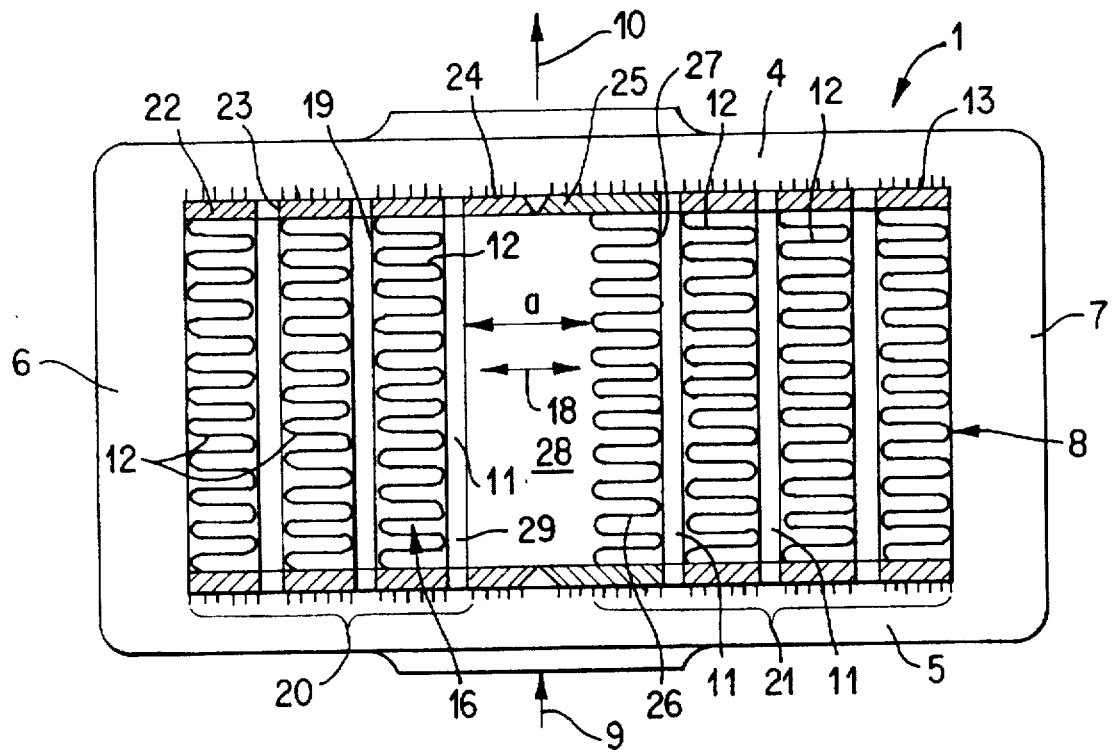
FIG. 1 is a cross-sectional schematic view of a first embodiment of the present invention at a distance in the starting condition.

FIG. 1 illustrates the basic construction of the charge air cooler 1 according to the present invention. The charge air cooler designated generally by the numeral 1 consists essentially of a cooler block 8, an upper water collecting box 4 and a lower water collecting box 5 being welded to the upper and lower block ends of the cooler block 8. Laterally, the cooler block 8 is in each case surrounded by a lateral part 6 and 7 which are fluid connected with the upper water box 4 and the lower water collecting box 5. The upper water collecting box 4 and the lower water collecting box 5 together with the lateral parts 6, 7 therefore form a receiving frame for the cooler block 8 which is inserted therein and is fixed by corresponding weld seams 13. The coolant, e.g. water, flows through the thus-defined receiving frame.

The cooler block 8 consists essentially of a plurality of water ducts 11 and air ducts 12 which are arranged on one another in a flat manner. The water ducts 11 are formed by wall plates 14 and rods 15 while the air ducts are formed by lamella plates 16. The lamella plates 16 are composed of a plurality of side-by-side lamella strips which, in a known manner, are made of a thin, very heat-conducting material which is deformed in a meandering manner such that, viewed from the front edge of the lamella plate 16, longitudinal ducts form whose width corresponds essentially to the lamella plate thickness. Several of these lamella plates 16 are arranged in the cooler block 8 alternating with water ducts 11 at regular distances and are welded to one another to form the cooler block 8. All cooler network parts consist of aluminum and are preferably connected with one another by hard soldering. Basically, the components may consist of unalloyed and alloyed steel, brass or copper. Although nonferrous metal constructions offer the best advantages with respect to the cooling performance, their manufacturing requires higher expenditures and costs.

The cooler block 8, which is composed, inter alia, of the above-mentioned plates 14, is normally prefabricated as a subassembly and is then inserted into the also separately manufactured coolant frame consisting of the upper water box 4, the lower water box 5, and the lateral walls 6, 7.

One lamella plate respectively is arranged in the cooler block 8 between two metal wall sheets 19 and is hard-soldered to these metal wall sheets by way of linear soldering seams along the apex line of the lamellae. This areal, two-sided soldering of the lamellae 12 with the metal wall sheets 19 changes the wall surfaces 19 and lamella plates 16, which themselves are slack with respect to bending, into a rigid sandwich structure which has sufficient stiffness in order to withstand within a wide range the ram pressure fluctuation in front of the charge air cooler which occurs in the transient engine operation.

Several of these thus prefabricated lamella plates are arranged side-by-side in the above-described manner and are each connected by way of a water duct 11 which is provided in-between and whose width is given by rods 15, to form the completely hard-soldered cooler block 8. The upper and lower open lateral surfaces of the lamella plate 16 are, in each case, sealed off by a strip 22 provided in the corresponding width so that, in the inserted condition, no cooling water from the cooling water boxes 4, 5 can arrive in the air ducts 12. In contrast, between two adjacent strips 22 respectively, the water ducts 11 are conductively connected with the lower water box 5 and the upper water box 4. For this purpose, the water ducts 11 are welded along the connecting points either to the water boxes 4, 5 or are also hard-soldered. Irrespective of the type of connection, these connecting points are normally provided as rigid connections, in which a maximum heat transfer between the wall surfaces 19 and the boxes 4, 5 is to be achieved.

In the embodiment illustrated in FIG. 1, the cooler block 8 of two partial blocks 20, 21 connected at a distance a with one another by way of corresponding connecting metal sheets 24, 25. It is important that the lamella plates 26 of the partial block 21 are soldered only on one side to the wall plate 27 of the adjoining water duct 11. As a result, the lamellae of this lamella plate 26 reach freely into the air duct 28 which has a wider construction. At the same time, however, the position of the partial blocks 20, 21 with respect to one another and with respect to the water boxes 4, 5 can be clearly defined by these respective connecting metal sheets 24, 25.

The above-described construction illustrated in FIG. 1 exists in the case of a heat exchanger in the starting condition, i.e., in the cold condition. If the operating conditions of the charge air cooler change as a result of a changed load demand on the engine, a charge air current of a higher temperature will flow through the charge air cooler 1, 2, 3. This hot air current flows through the air ducts 12 along the lamellae arranged therein and heats these within a few seconds to the air temperature. The heat quantity of the charge air current which in the process was transferred to the lamellae is taken up by way of thermal conduction by the cooling water which flows through the water ducts in the direction from the lower water collecting box 5 to the upper water collecting box 4 and is transported out of the charge air cooler 1. The lamellae, having been heated up, bend in the direction of the arrow 18, thus in the transverse direction of the illustrated charge air cooler 1. Because of the meandering guiding of the lamellae within a lamella plate 16, the longitudinal expansions in the flow direction of the cooling water are compensated. In contrast, the longitudinal expansion of the lamellae in the transverse direction 18 leads directly to a widening of the lamella plate thickness since, as described above, along their apex lines, the lamellae are fixedly connected or hard-soldered with the adjoining sheet metal walls 19. The stiffening of the lamella plates 16 which, on one hand, is intended as a result of the soldering has, on the other hand, the disadvantage that the temperature-caused longitudinal expansion of the lamella flanks results in a direct enlargement of the width of the lamella plate 16.

As described in FIG. 1, the water ducts 11 are connected in a form-locking and force-locking manner with the water collecting boxes 4 and 5 and because, as a result of the connecting points situated in the direct proximity of large amounts of cooling water, there occurs a corresponding low thermal transverse expansion. Consequently, the thermal transverse expansion of the lamellae in the direction of the arrow 18 will finally result in a bending of the lamella plate 16 in the transverse direction. Inasmuch as the individual plates 16, 11 are hard-soldered to one another, the thermal expansions of the individual plates within a block 8 will add up.

Figure 2:
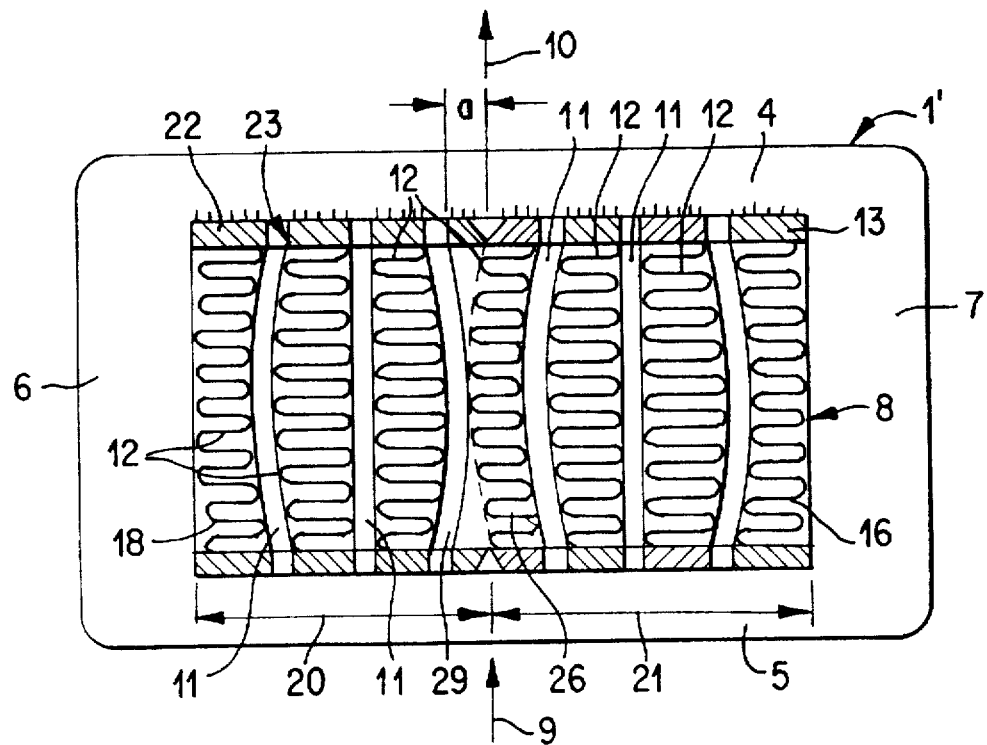
FIG. 2 is a similar view of the embodiment in FIG. 1 but in the operating condition without any plastic deformation.

In a heat exchanger with the two-part cooler block 8 and the in-between distance a illustrated in the operating condition in FIG. 2, it is clearly shown how the individual blocks in each case bend in the transverse direction, or expand. To that extent, the reaction of the charge air cooler corresponds to that of known charge air coolers. Because of the division of the cooler block 8 according to the present invention in the form illustrated in FIG. 1, however, the summation of individual thermal expansions is interrupted in a targeted manner. As a result of the distance a between the water duct 29 and the lamella plate 26, the thus created wide air duct 28 is used as a quasi buffer for the thermally caused expansion of the partial blocks 20, 21 taking place on both sides. At the same time, because of the two-part division of the cooler block 8, the bending as well as the angular change of the water ducts and air ducts is cut in half at least in the lamella plates 16 adjoining the lateral parts 6 and 7.

If, as indicated in FIG. 2, distances are provided also on both sides of the cooler block 8 and between the lateral parts 6, 7, the outermost lamella plates 16 will also not be deformed with corresponding bending. The distance a is dimensioned such that the thermally caused expansion of the outermost lamella layer 26 of the partial block 21, together with the longitudinal-expansion-caused bending of the water duct 29, correspond precisely to the distance a. Since such a dimensioning of the distance can be carried out only purely empirically, this method of dimensioning the distance requires higher costs.

Figure 3:
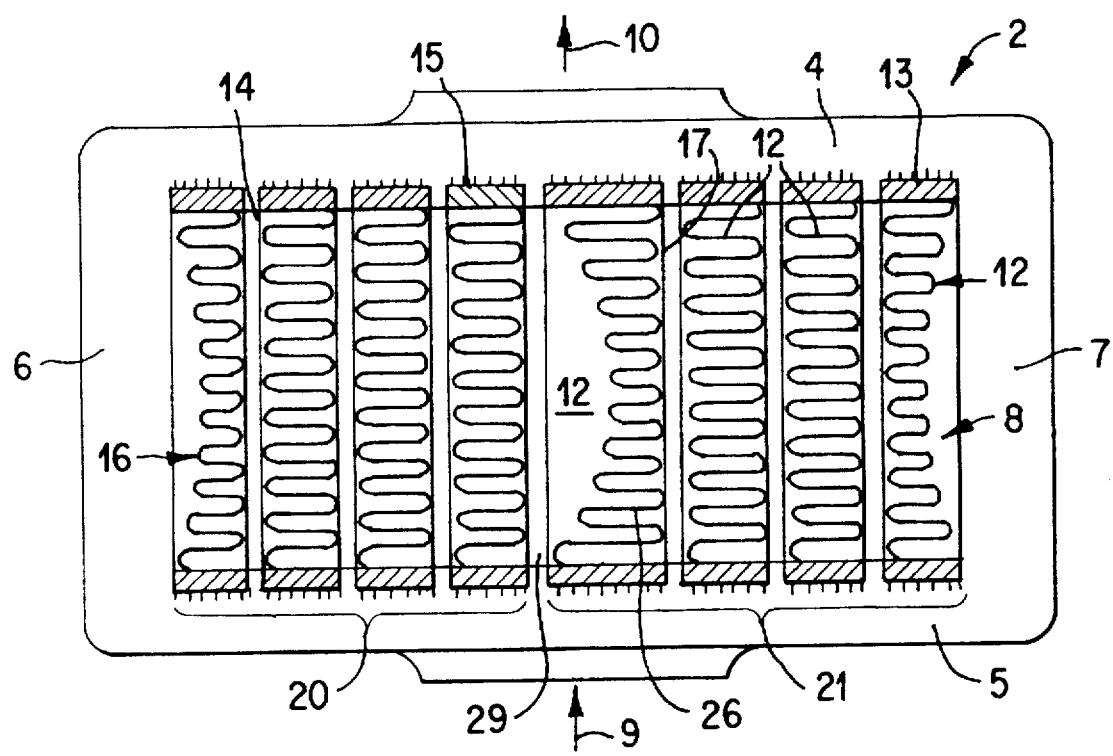
FIG. 3 is a view of a second embodiment of the present invention in the operating condition after the calibrating operation.

The embodiment illustrated in FIG. 3 helps to save these costs. In particular, the two partial blocks 20, 21 are not combined at a mutual distance from one another to form the cooler block 8 but, without any distance from the water duct 29, the lamella plate 26 is not soldered thereto. Because of the nonexisting soldering of the lamella apexes of the lamella plate 26, this lamella plate 28 has a lower rigidity than the remaining lamella plates hard-soldered on both sides. If thermal expansions now occur in the operating condition, the partial blocks 20, 21 will widen independently of one another, but the thermal-expansion-caused tensions cannot be transmitted by the less rigid lamella plate 26. Thus, the lamella plate 26 represents a desired weak point in the cooler block composite which, as the weakest member, compensates the occurring thermally caused expansions of both blocks along the junction plane, and in the counter-pressure to the water duct 29, their lamellae are elastically deformed corresponding to the bending line. Although, when the cooler block 8 then cools off again, the bending of the individual plates will diminish correspondingly, the lamellae of the lamella plate 26 remain permanently plastically deformed. It is essential to the invention that, during the cooling process, there is no more plastic redeformation of the lamellae and these are therefore no longer deformed during another heating-up of the charge air cooler if no other temperature maximum is reached.

Figure 4:
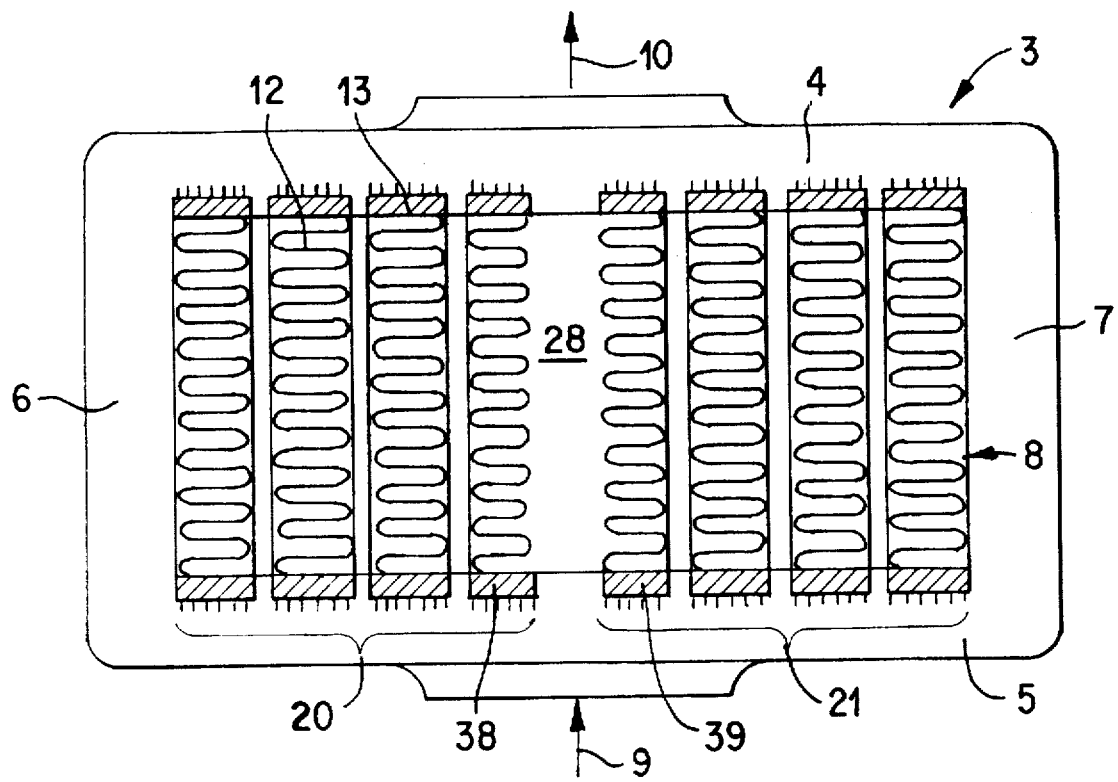
FIG. 4 is a view of a third embodiment of the invention with a double lamella layer.

In the third embodiment illustrated in FIG. 4, the cooler block is also divided into two partial blocks 20, 21 and is mounted into the coolant receiving frame at a mutual distance. In contrast to the above-described embodiment, however, no lamella plate 26 and water duct 29 meet one another but, on both mutually facing lateral surfaces of the partial blocks 20, 21, lamella plates 38, 39 are fastened on one side in a manner of the lamella plate 26 in the case of the embodiment illustrated in FIG. 3. This ensures that, in the air duct 28, charge air cannot flow unhindered, particularly without any cooling, through the charge air cooler 3. The reason is that, because of this two-sided arrangement of lamella plates 28, 39, heat transfer medium also passes through the air duct 28, even though there is no transmission of the thermally caused displacement from one partial block 20, 21 to the next. The lamella strips 38, 39 may clearly have a more compact construction than the other lamella strips 16. A special case is a construction of the lamella strips 38, 39 with a width half the size of that of the other lamella strips 16 so that both together take up the same plate thickness as the other lamella plates.

If, in a corresponding heating-up of the cooler block 8, the lamella plates 38, 39 meet one another because of the thermal bending, these are either pushed into one another possibly while being elastically deformed or the lamellae 38, 39 which are each less rigid are plastically deformed correspondingly. Because here also, however, in the event of plastic deformation, only a one-dimensional stressing of the lamellae takes place, the material limits are not reached and heat-expansion-caused disturbances of the charge air cooler 3 are therefore avoided.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A heat exchanger of a plate construction in a water-cooled charge air cooler, comprising a cooler block having metal sheets and rods arranged substantially parallel and at regular distances to form water ducts, lamella plates forming air ducts, lateral parts and water collecting boxes fastened in a liquid-tight manner on cooler block ends feeding and discharging a coolant, wherein the cooler block is divided into at least two partial blocks along at least one plane parallel to a plane of the plates, in which the sheets and the lamella plates of respective partial blocks are spaced to form a clearance therebetween for preventing deformation of cooler block components resulting from thermal expansion.

2. The heat exchanger according to claim 1, wherein the distance is such that plates of the at least two partial blocks are oppositely situated to contact one another when thermal expansion occurring at a maximal operating temperature of the lamella plates.

3. The heat exchanger according to claim 1, wherein the cooler block is divided along a contact plane of a metal wall sheet of a water duct of one of the at least partial blocks, and a lamella plate of another of the partial blocks is arranged adjoining thereto.

4. The hear exchanger according to claim 3, wherein the distance is such that plates of the at least two partial blocks are oppositely situated to contact one another when thermal expansion occurring at a maximal operating temperature of the lamella plates.

5. The heat exchanger according to claim 1, wherein mutually facing plates of the at least two partial blocks are lamella plates.

* * * * *